United States Patent [19]
LaRoche et al.

[11] Patent Number: 5,908,921
[45] Date of Patent: Jun. 1, 1999

[54] METHOD OF MANUFACTURING GELATIN

[75] Inventors: Scott W. LaRoche, Salem, N.H.; David J. Roy, Peabody, Mass.; John S. Brand, Pittsford, N.Y.

[73] Assignee: Eastman Kodak Company, Rochester, N.Y.

[21] Appl. No.: 09/185,443

[22] Filed: Nov. 3, 1998

[51] Int. Cl.$^6$ .............................. A61K 38/17; C08H 1/00
[52] U.S. Cl. ................. 530/354; 530/356; 530/355; 106/160.1; 8/517
[58] Field of Search ............. 106/160.1; 530/354, 530/355, 356

[56] References Cited

U.S. PATENT DOCUMENTS

| | | | |
|---|---|---|---|
| 3,514,518 | 5/1970 | Charier-Vadrot | 424/360 |
| 4,360,590 | 11/1982 | Tomka et al. | 430/642 |
| 4,824,939 | 4/1989 | Simpson | 530/356 |
| 5,459,241 | 10/1995 | Moy et al. | 530/355 |

*Primary Examiner*—Cecilia J. Tsang
*Assistant Examiner*—Fabian A. Jameison
*Attorney, Agent, or Firm*—Carl F. Ruoff

[57] ABSTRACT

The present invention is a process for the manufacture of gelatin which includes providing a collagen containing material and demineralizing the collagen containing material to produce ossein. The ossein is added to a water solution containing at least 3% sodium hydroxide or potassium hydroxide and at least 3% sodium sulfate for a time sufficient to form a reacted slurry. The reacted slurry is heated to a temperature of at least 45° C. for a time sufficient to solubilize the ossein thereby producing a solution containing gelatin. The pH of the solution containing gelatin is raised to greater than 9.8. The pH of the solution containing gelatin is reduced with a sulfate salt of a divalent or trivalent metal to a neutral pH (between 7.0 and 8.0). The pH of the gelatin solution is then lowered to between 5.0 and 6.0 and a polymeric flocculant is added to the gelatin solution in an amount of less than 0.1% based on the dry weight of the gelatin to form a floc and the floc is removed. The resulting gelatin is filtered and desalted.

10 Claims, No Drawings

METHOD OF MANUFACTURING GELATIN

FIELD OF THE INVENTION

The present invention relates to gelatin manufacture and more particularly to a method to produce high purity gelatin suitable for photographic use.

BACKGROUND OF THE INVENTION

High purity gelatins are generally required for imaging applications. Currently the most commonly employed manufacturing process for obtaining high purity gelatins involves demineralization of bone, followed by extended alkaline treatment (liming) and finally gelatin extractions with water of increasing temperature as described in U.S. Pat. Nos. 3,514,518, and 4,824,939. This process commonly referred to as lime processed ossein has existed with various modifications throughout the gelatin industry for a number of years. The liming step of this process requires up to 60 days or more, the longest step in the approximately 3 month process of producing gelatin. The extended time required by the current limed ossein process for producing gelatin results in the need for increased inventories of the work in progress.

An object of the present invention is to reduce the typical 3 month processing time required to extract photographic quality gelatin from ossein.

SUMMARY OF THE INVENTION

The present invention is a process for the manufacture of gelatin which includes providing a collagen containing material and demineralizing the collagen containing material to produce ossein. The ossein is added to a water solution containing at least 4% sodium hydroxide or potassium hydroxide and at least 4% sodium sulfate for a time sufficient to form a reacted slurry. The reacted slurry is heated to a temperature of at least 45° C. for a time sufficient to solubilize the ossein thereby producing a solution containing gelatin. The pH of the solution containing gelatin is raised to greater than 9.8. The pH of the solution containing gelatin is reduced with a sulfate salt of a divalent or trivalent metal to a neutral pH. The pH of the gelatin solution is then lowered to between 5.0 and 6.0 and a polymeric flocculant is added to the gelatin solution in an amount of less than 0.1% based on the dry weight of the gelatin to form a floc and the floc is removed. The resulting gelatin is filtered and desalted.

DETAILED DESCRIPTION OF THE INVENTION

The present invention describes a novel process for the production of high purity gelatin utilizing the action of a caustic solution to prepare gelatin from a collagen containing material, typically demineralized cattle bone. This method of manufacturing gelatin described here produces a gelatin with very low color, high gel strength and low viscosity. This high purity gelatin is produced with a dramatic reduction in gelatin manufacturing cycle time due to replacement of the liming step with a faster, shorter caustic process. Further, the caustic method of manufacturing gelatin results in lower unit manufacturing costs due to increased yield, increased gelatin uniformity, reduced water usage and reduced utility costs.

High purity gelatins are required for imaging/photographic applications. One gelatin property of interest is absorbance at 420 nm (A420), commonly know as color. The lower the A420 of gelatin the clearer the gelatin layer is in coated products. The A420 of gelatin is one of the defining factors for determining applicability of the gelatin for imaging applications. Edible gelatins are typically higher than photographic gelatins in A420. Two other gelatin properties critical to imaging applications are viscosity and gel strength or Bloom. High gel strength is required for gelatin setting properties. Typical alkaline processed bone gelatins contain high gel strength and high viscosity. Viscosity can be controlled during the gelatin manufacturing process with heat treatment. Heat treatment reduces both gel strength and viscosity. Ideally, a gelatin with high gel strength and low viscosity would be advantageous to coated products, in that coating speeds could be increased with no loss in gelatin setting properties. Typical gel strengths are from 250 to 300 Bloom and typical viscosities are from 5 to 15 cP.

Due to variable bond breakage during manufacture, gelatin is composed of a distribution of polypeptides of varying molecular weights. Aqueous size exclusion chromotagraphy provides a method of analysis for determining the gelatin molecular weight distribution. This distribution is described as containing the following fractions; high molecular weight or HMW (>250 K daltons); Beta (250–150 K daltons); Alpha (150–50 K daltons); Subalpha (50–20 K daltons); and low molecular weight or LMW (20–4 K daltons). In general, high gel strength correlates with high gelatin alpha fraction content, and high viscosity correlates with high gelatin HMW fraction content.

Following the caustic process, gelatin is dissolved in a single extraction, creating a very uniform gelatin with minimal time and energy. The extracted gelatin is purified through the use of a clarification process and desalted, typically using ultrafiltration or electrodialysis technology.

Typical collagen containing materials include skins, bones and hides (ie. any connective tissue of an animal body). Sources of animal bodies include cattle, pigs and sheep. The most preferred source for collagen for production of high quality gelatin is cattle bone.

Bone is one of the most important raw materials for the manufacture of photographic quality gelatin. Typically, the previously degreased, dried, sized and density separated bone is demineralized with acid, treated with lime and washed prior to extraction. Cattle bone is preferred, although other sources of bone can be effectively utilized in the present invention.

A continuous process for leaching cattle bone is described in U.S. Pat. No. 4,824,939, incorporated herein by reference. In this process the bovine bone is placed into contact with an acid, typically hydrochloric acid. The acid reacts with the minerals contained in the bone to form soluble products, such as calcium chloride and phosphoric acid. These products are leached out of the bone and removed, typically as calcium hydrogen phosphate dihydrate. The dimineralized bone or ossein is one source of collagen from which gelatin can be extracted.

The present invention describes a process for the manufacture of gelatin from a collagen containing material utilizing a caustic solution to produce gelatin. A collagen containing material demineralized to produce ossein which is homogenized or ground. The ossein is added to a water solution of sodium hydroxide or potassium hydroxide at a concentration of at least 4% by weight and a swelling restraining salt (ie. sodium sulfate) at a concentration of at least 3% by weight for a time sufficient (typically 10 to 120 hours) to form a reacted slurry. The slurry is heated at a temperature of at least 45° C. for a time sufficient (at least 30 minutes) to produce a gelatin containing solution. The gelatin containing solution is clarified by raising the pH of the solution to greater than 9.8. A sulfate salt of a divalent or trivalent metal is added to the gelatin solution to reduce the pH to between 7.0 and 8.0. An acid, preferably phosphoric, is added to the solution to reduce the pH to between 5.0 and 6.0. A polymeric flocculant is added to the gelatin containing solution at a weight percent of 0.1 based on the dry weight of the gelatin to form a floc which is removed. Following extraction and clarification the gelatin solution is, filtered, oxidized or deionized to achieve desired levels of microconstituents, prior to concentration and drying. The rate of reaction with the collagen is a function of caustic concentration, salt concentration, temperature and time.

The present invention is illustrated by the following example.

EXAMPLE 1

Gelatin from caustic treatment of ossein

Cattle bone was demineralized to obtain ossein which was ground to 0.125 inches and added to a water solution containing 6% sodium hydroxide and 12% sodium sulfate at low temperatures (<18° C.) for a time sufficient to complete the reaction (approximately 2 days). The reaction was quenched with addition of sulfuric acid until a neutral pH was reached. The solution was heated to 55° C. to denature the ossein into a gelatin solution. The denaturing process destroys the tertiary and quaternary structure of the protein and solubilizes the ossein into gelatin. Following denaturation the solution was clarified, filtered, desalted using ultrafiltration, deionized, concentrated and dried. The clarification procedure used included addition of lime (5–7 BE or degrees Baume) (6 degrees Baume is equivalent to 53.8 g CaO/liter) to achieve a pH of about 9.8, followed by addition of aluminum sulfate (25%) to reduce the pH to 7.5 and addition of phosphoric acid (10%) to reduce the pH to 5.2. A floc was formed by the addition of a polyacrylamide polymer (0.1% w/v) to an aerated gelatin solution. Upon removal of the floc, the gelatin was plate and frame filtered, deionized, concentrated, pH adjusted to pH 5.75 and dried.

The gelatin obtained (E1) is described below.

Color=0.105

Haze=0.013

Gel Strength=370 grams

Viscosity=14.0 cP

HMW=28.86%

Beta=18.17%

Alpha=49.71%

Isoelectric Point=4.9

As illustrated above the gelatin produced by the present process is of a low color and high gel strength which is suitable for photographic applications.

The invention has been described in detail with particular reference to certain preferred embodiments thereof, but it will be understood that variations and modifications can be effected within the spirit and scope of the invention.

What is claimed is:

1. A process for the manufacture of gelatin comprising:

providing a collagen containing material;

demineralizing the collagen containing material to produce ossein;

adding the ossein to a water solution containing at least 4% sodium hydroxide or potassium hydroxide and at least 3% sodium sulfate for a time sufficient to form a reacted slurry;

heating the slurry to at least 45° C. for a time sufficient to produce a solution containing gelatin;

raising the pH of the gelatin solution to greater than 9.8;

adding a sulfate salt of a divalent or trivalent cation to the gelatin solution to reduce the pH to between 7.0 and 8.0;

adding an acid to the gelatin solution to reduce the pH to between 5.0 and 6.0;

adding a polymeric flocculant to the gelatin solution in an amount of about 0.1 percent based on a dry weight of the gelatin to produce a floc;

removing the floc from the gelatin solution;

filtering the gelatin solution; and desalting the gelatin solution.

2. The process of claim 1 further comprising:

concentrating the gelatin.

3. The process of claim 1 further comprising:

grinding the ossein to a size of less than 0.25 inches after demineralizing the collagen containing material.

4. The process of claim 1 wherein the time sufficient to form a reacted slurry is from 10 to 120 hours.

5. The process of claim 1 wherein the time sufficient to solubilize the gelatin is at least 30 minutes.

6. The process of claim 1 wherein the acid added to the gelatin solution comprises phosphoric acid.

7. The process of claim 1 wherein the polymeric flocculant comprises polyacrylamide polymer.

8. The process of claim 1 wherein the sulfate salt comprises aluminum sulfate.

9. The process of claim 1 wherein the desalting step comprises ultrafiltration or electrodialysis.

10. The process of claim 1 wherein the gelatin is oxidized with hydrogen peroxide.

* * * * *